US011836353B2

(12) United States Patent
Fan et al.

(10) Patent No.: US 11,836,353 B2
(45) Date of Patent: Dec. 5, 2023

(54) METHOD, DEVICE, AND COMPUTER PROGRAM PRODUCT FOR REBUILDING STORAGE SYSTEM

(71) Applicant: EMC IP Holding Company LLC, Hopkinton, MA (US)

(72) Inventors: Huijuan Fan, Chengdu (CN); Chi Chen, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 17/168,565

(22) Filed: Feb. 5, 2021

(65) Prior Publication Data
US 2022/0075530 A1 Mar. 10, 2022

(30) Foreign Application Priority Data

Sep. 10, 2020 (CN) .......................... 202010950465.9

(51) Int. Cl.
*G06F 3/06* (2006.01)
*G06F 11/10* (2006.01)

(52) U.S. Cl.
CPC ............ *G06F 3/0619* (2013.01); *G06F 3/067* (2013.01); *G06F 3/0653* (2013.01); *G06F 3/0659* (2013.01); *G06F 3/0689* (2013.01); *G06F 11/1076* (2013.01)

(58) Field of Classification Search
CPC .... G06F 3/0619; G06F 3/0653; G06F 3/0659; G06F 3/067; G06F 3/0689; G06F 11/1076; G06F 3/0607; G06F 3/0629; G06F 11/1088
See application file for complete search history.

(56) References Cited

U.S. PATENT DOCUMENTS

| 6,571,354 | B1 | * | 5/2003 | Parks | .................... | G06F 11/008 |
| | | | | | | 714/6.32 |
| 8,689,040 | B2 | | 4/2014 | Kidney et al. | | |
| 9,513,835 | B2 | * | 12/2016 | Alatorre | ................ | G06F 3/0604 |
| 9,690,660 | B1 | * | 6/2017 | Robins | ................ | G06F 11/1088 |
| 9,880,760 | B2 | * | 1/2018 | Inbar | ....................... | G06F 3/065 |

(Continued)

FOREIGN PATENT DOCUMENTS

| CN | 110737390 A | 1/2020 |
| CN | 111104051 A | 5/2020 |

*Primary Examiner* — Matthew M Kim
*Assistant Examiner* — Matthew N Putaraksa
(74) *Attorney, Agent, or Firm* — BainwoodHuang

(57) ABSTRACT

Techniques reconstruct a storage system. A first extent access load and a second extent access load of a first malfunctioning extent and a second malfunctioning extent in a malfunctioning storage device in the storage system are acquired, respectively. The first malfunctioning extent is selected as a source extent in response to determining that the first extent access load is lower than the second extent access load. Among multiple idle extents in the storage system, a set of destination extents that can be used as a reconstruction destination of the source extent are generated. A destination extent is selected from the set of destination extents as the reconstruction destination of the source extent. It is possible to preferentially select a reconstruction destination for a malfunctioning extent with a low access load, thereby increasing the reconstruction speed of the storage system.

20 Claims, 9 Drawing Sheets

(56) References Cited

U.S. PATENT DOCUMENTS

| | | | |
|---|---|---|---|
| 10,496,483 B2* | 12/2019 | Xiao | G06F 3/0644 |
| 10,809,931 B1* | 10/2020 | Martin | G06F 3/061 |
| 10,983,862 B2 | 4/2021 | Armangau et al. | |
| 11,093,156 B1* | 8/2021 | Lin | G06F 11/2056 |
| 11,307,802 B2* | 4/2022 | Patel | G06F 9/505 |
| 2002/0059189 A1* | 5/2002 | Hanes | G06F 3/0605 |
| 2011/0225453 A1 | 9/2011 | Spry et al. | |
| 2013/0238930 A1* | 9/2013 | Umbehocker | G06F 11/2092 |
| | | | 714/6.32 |
| 2016/0371146 A1* | 12/2016 | Resch | H04L 9/0861 |
| 2018/0081757 A1* | 3/2018 | Chiba | G06F 3/0689 |
| 2018/0275894 A1* | 9/2018 | Yoshino | G06F 3/0689 |
| 2019/0129795 A1* | 5/2019 | Xu | G06F 11/2094 |
| 2019/0286525 A1* | 9/2019 | McShane | H03M 13/353 |
| 2019/0332478 A1 | 10/2019 | Gao et al. | |
| 2021/0124493 A1* | 4/2021 | Gurindapalli | G06F 3/067 |
| 2021/0263677 A1* | 8/2021 | Patel | G06F 9/5016 |
| 2022/0138046 A1* | 5/2022 | Zhang | G06F 11/1088 |
| | | | 714/6.22 |

* cited by examiner

METHOD, DEVICE, AND COMPUTER PROGRAM PRODUCT FOR REBUILDING STORAGE SYSTEM

CROSS-REFERENCE TO RELATED APPLICATION

This application claims priority to Chinese Patent Application No. CN202010950465.9, on file at the China National Intellectual Property Administration (CNIPA), having a filing date of Sep. 10, 2020, and having "METHOD, DEVICE, AND COMPUTER PROGRAM PRODUCT FOR REBUILDING STORAGE SYSTEM" as a title, the contents and teachings of which are herein incorporated by reference in their entirety.

TECHNICAL FIELD

Implementations of the present disclosure relate to storage management, and more particularly, to a method, a device, and a computer program product for reconstructing a storage system.

BACKGROUND

With the development of data storage technologies, various data storage devices have been able to provide users with increasingly high data storage capabilities, and the data access speed has also been greatly improved. While data storage capabilities are improved, users also have increasingly high demands for data reliability and the response time of storage systems. At present, various data storage systems based on the Redundant Array of Independent Disks (RAIDs) have been developed to improve data reliability. When one or more disks in a storage system malfunction, data in the malfunctioning disks can be reconstructed from data on other normally operating disks.

A mapped RAID has been developed at present. In this mapped RAID, disk is a logical concept and may include multiple extents. Multiple extents included in a logical disk can be distributed on different physical storage devices in a resource pool. For multiple extents in one stripe of the mapped RAID, the multiple extents should be distributed on different physical storage devices. This makes it possible to perform, when a physical storage device where one of the multiple extents is located malfunctions, a reconstruction operation to recover data from physical storage devices where other extents are located. At this moment, how to improve reconstruction efficiency has become a hot spot of research.

SUMMARY OF THE INVENTION

Therefore, it is expected to develop and implement a technical solution for reconstructing a storage system in a more effective manner. It is expected that this technical solution can be compatible with existing storage systems, and can reconstruct a storage system in a more effective manner.

According to a first aspect of the present disclosure, a method for reconstructing a storage system is provided. In this method, a first extent access load and a second extent access load of a first malfunctioning extent and a second malfunctioning extent in a malfunctioning storage device in the storage system are acquired, respectively. The first malfunctioning extent is selected as a source extent in response to determining that the first extent access load is lower than the second extent access load. Among multiple idle extents in the storage system, a set of destination extents that can be used as a reconstruction destination of the source extent are generated. A destination extent is selected from the set of destination extents as the reconstruction destination of the source extent.

According to a second aspect of the present disclosure, an electronic device is provided, including: at least one processor; and a memory coupled to the at least one processor, wherein the memory has instructions stored therein which, when executed by the at least one processor, cause the device to perform the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings.

DETAILED DESCRIPTION

Figure 1:
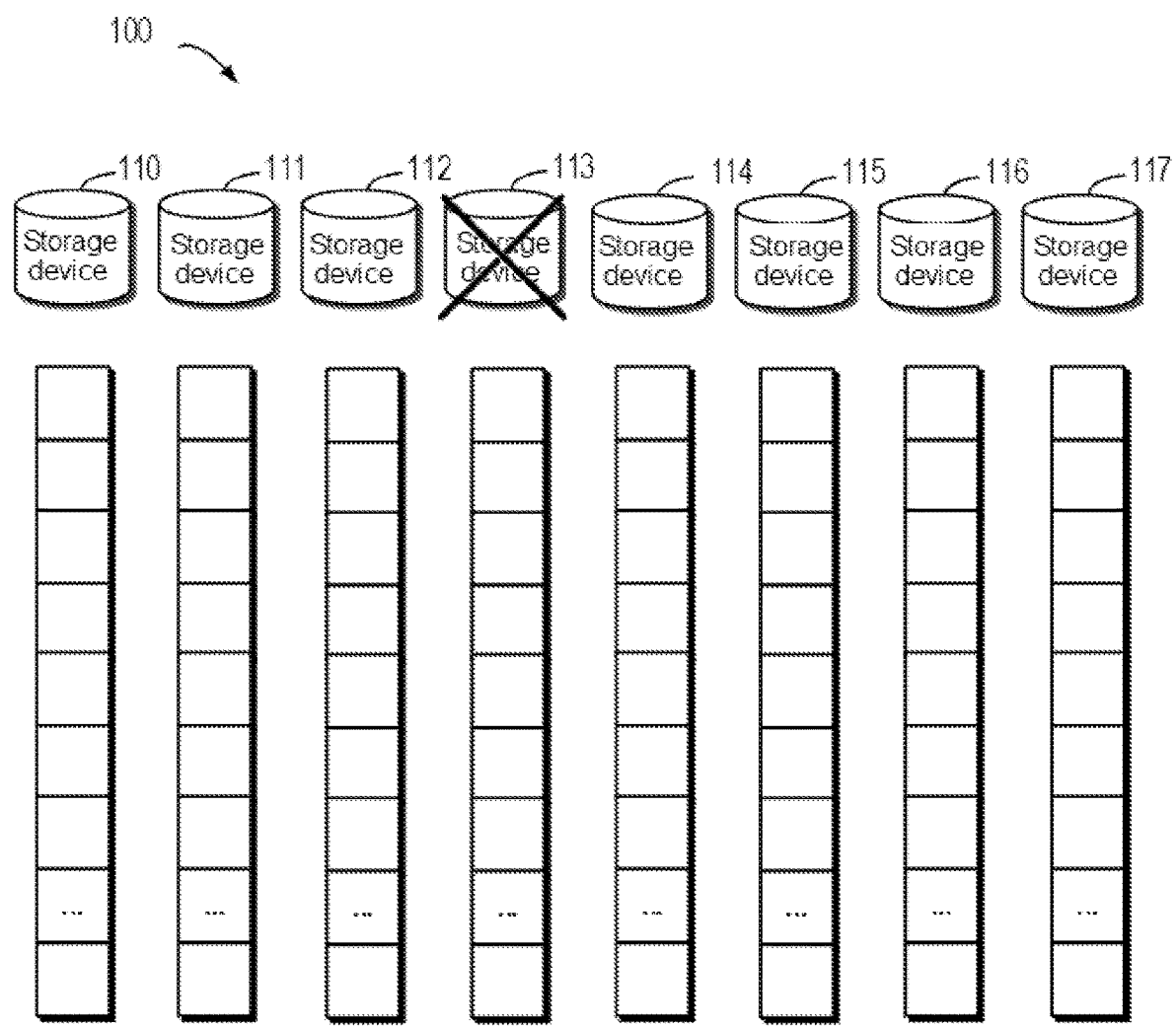
FIG. 1 schematically illustrates a block diagram of a storage system in which a method according to an example implementation of the present disclosure can be used.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred implementations of the present disclosure will be described in more detail with reference to the accompanying drawings. Although the preferred implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

As used herein, the term "including" and variations thereof mean open-ended inclusion, that is, "including but not limited to." Unless specifically stated, the term "or" indicates "and/or." The term "based on" means "based at least in part on." The terms "one example implementation" and "one implementation" mean "at least one example implementation." The term "another implementation" means "at least one further implementation." The terms "first," "second," etc., may refer to different or the same objects. Other explicit and implicit definitions may also be included below.

In the context of the present disclosure, a storage system may be an RAID-based storage system. The RAID-based storage system may combine multiple storage devices into one disk array. By providing redundant storage devices, the reliability of the entire disk group may greatly exceed that of a single storage device. RAID may provide various advantages over a single storage device, such as enhanced data integration, enhanced fault tolerance, increased throughput or capacity, and so on. There are multiple standards for RAID, such as RAID-1, RAID-2, RAID-3, RAID-4, RAID-5, RAID-6, RAID-10, RAID-50, and so on.

When different RAID standards are used, the allowed numbers of malfunctioning storage devices are different. For example, in a 4D+1P storage system, 4 storage devices are used to store data, and 1 storage device is used to store checks. At this moment, at most 1 storage device is allowed to malfunction. For another example, in a 4D+1P+1Q storage system, 4 storage devices are used to store data, and 2 storage devices are used to store checks. At this moment, at most 2 storage devices are allowed to malfunction. For yet another example, in a 4D+1P+1Q+1R storage system, 4 storage devices are used to store data, and 3 storage devices are used to store checks. At this moment, at most 3 storage devices are allowed to malfunction.

For the convenience of description, in the context of the present disclosure, only a 4D+1P storage system will be used as an example to describe the process of a reconstruction operation. Firstly, an application environment of an example implementation of the present disclosure will be described with reference to FIG. 1. FIG. 1 schematically illustrates block diagram 100 of a storage system in which a method according to an example implementation of the present disclosure can be used. As shown in FIG. 1, the storage system may include multiple storage devices 110, 111, 112, 113, 114, 115, 116, and 117. The storage space of these storage devices may include a storage area for storing data and a reserved area for serving reconstruction operations. When one or more storage devices in the storage system malfunction, the data in the malfunctioning storage devices can be recovered to the reserved area. It will be understood that FIG. 1 only schematically illustrates an example of a storage system including 8 storage devices. According to an example implementation of the present disclosure, based on a specific configuration of the storage system, this storage system may include more or fewer storage devices.

Assuming that storage device 113 malfunctions, data in each extent in storage device 113 can be reconstructed to other storage devices in the storage system. At present, a variety of reconstruction technical solutions have been proposed. For example, the reconstruction destination of the malfunctioning extent can be randomly selected, the reconstruction destination can be selected based on the available storage space in each storage device, and so on. However, these technical solutions may result in a long reconstruction time. During the reconstruction operation, other storage devices in the storage system may malfunction. If the number of malfunctioning storage devices exceeds the threshold allowed by RAID, unrecoverable data loss may be caused. Therefore, how to complete the reconstruction operation at a higher speed has become an important factor in ensuring data security of the storage system.

In order to at least partially solve the above problems, according to an example implementation of the present disclosure, a method for reconstructing a storage system is proposed. Specifically, when a malfunctioning storage device is present in the storage system, based on the access load of each malfunctioning extent in the malfunctioning storage device, a destination extent is preferentially selected for a malfunctioning extent with a low access load. It will be understood that the lower the access load, the smaller the impact on the reconstruction operation. Therefore, all the malfunctioning extents can be reconstructed in an order from easy to difficult. In this way, the malfunctioning extent that is most easily reconstructed can be reconstructed to the selected destination extent first. As a result, as many malfunctioning extents as possible can be reconstructed in a short time, thereby reducing the risk of unrecoverable data loss.

Figure 2:
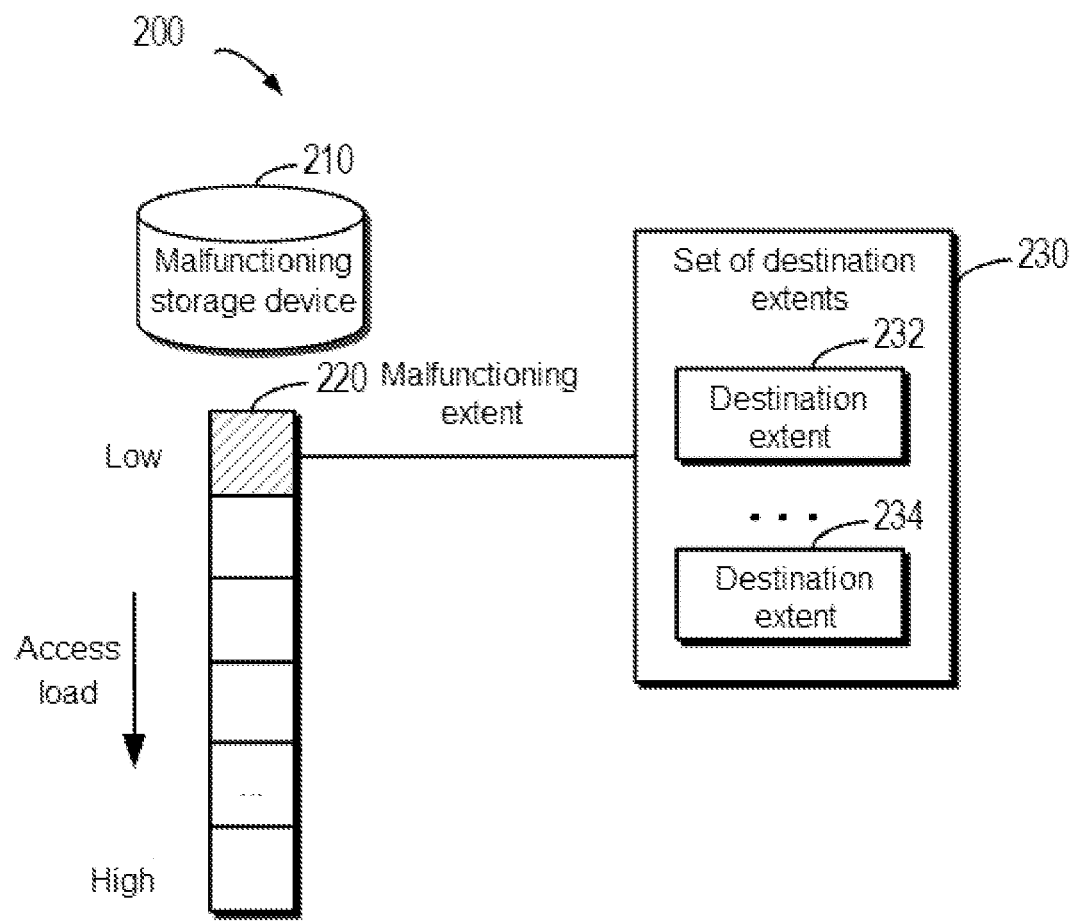
FIG. 2 schematically illustrates a block diagram of a process for reconstructing a storage system according to an implementation of the present disclosure.

Hereinafter, an overview of an example implementation according to the present disclosure will be described with reference to FIG. 2. FIG. 2 schematically illustrates block diagram 200 of a process for reconstructing a storage system according to an implementation of the present disclosure. As shown in FIG. 2, assuming that malfunctioning storage device 210 is present in the storage system, multiple malfunctioning extents in malfunctioning storage device 210 can be ranked according to access loads of the multiple malfunctioning extents. Then, malfunctioning extent 220 with a low access load can be used as a source extent to be reconstructed, and set of destination extents 230 can be generated for the source extent. Set of destination extents 230 includes multiple destination extents that can be used as a reconstruction destination of the source extent, such as destination extent 232, . . . , and destination extent 234. Furthermore, a destination extent can be selected from set of destination extents 230 as the reconstruction destination of the source extent. All the malfunctioning extents can be reconstructed one by one according to the order of access loads from low to high.

With the example implementation of the present disclosure, in each process of selecting a source extent, malfunctioning extent 220 with a short reconstruction time can be used as the source extent. In this way, all the malfunctioning extents can be reconstructed in an order from easy to difficult, and then more malfunctioning extents can be reconstructed in the shortest time.

Figure 3:
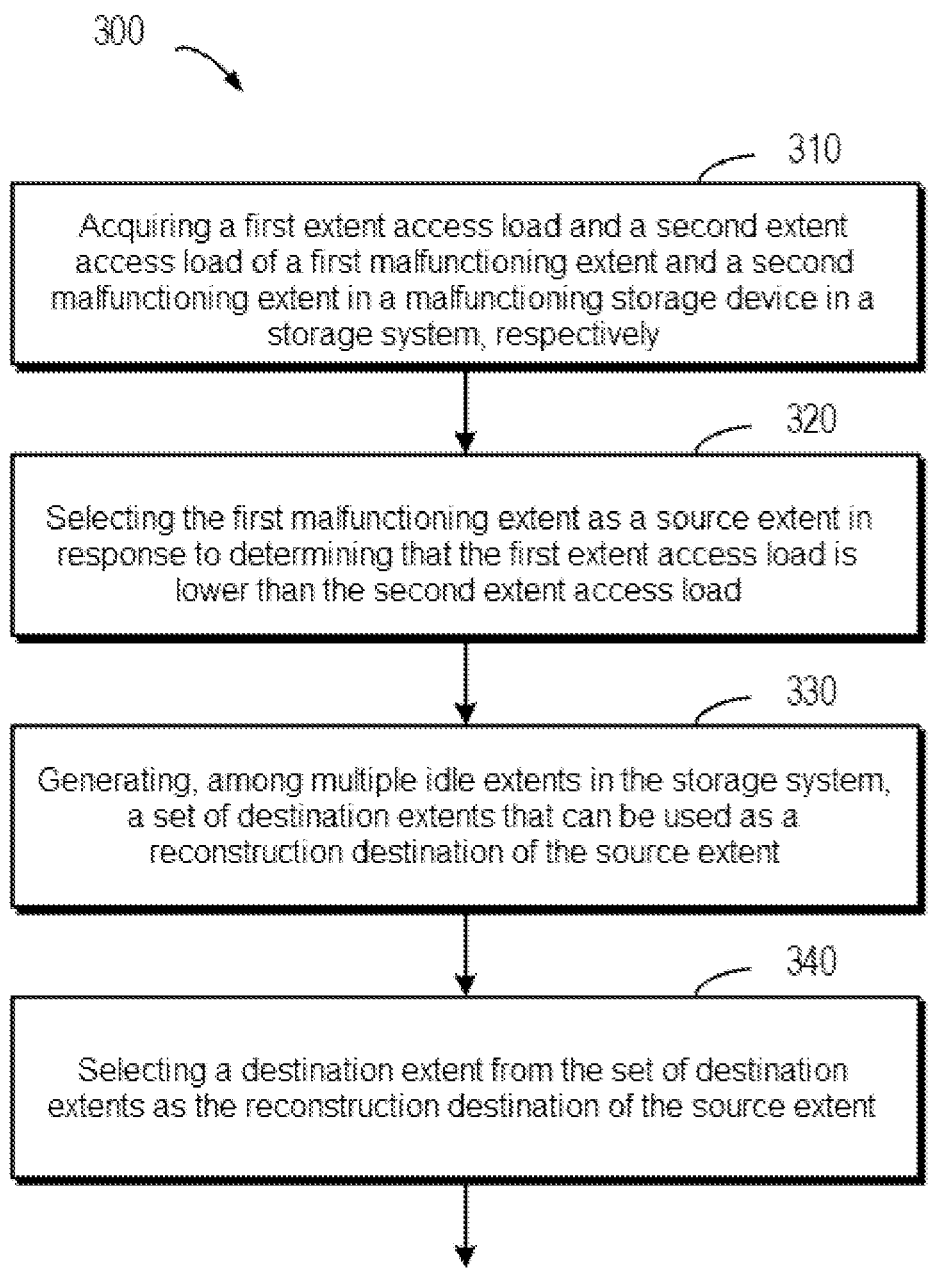
FIG. 3 schematically illustrates a flowchart of a method for reconstructing a storage system according to an implementation of the present disclosure.

Hereinafter, more details of the method according to an example implementation of the present disclosure will be described with reference to FIG. 3. FIG. 3 schematically illustrates a flowchart of method 300 for reconstructing a storage system according to an implementation of the present disclosure. At block 310, a first extent access load and a second extent access load of a first malfunctioning extent and a second malfunctioning extent in a malfunctioning storage device in the storage system are acquired, respectively. The access load can be measured based on multiple methods. For example, the access load can be determined based on the frequency of an extent being accessed, and the access load can be determined based on the size of data accessed in an extent. According to an example implementation of the present disclosure, the access load of each extent can be expressed in terms of access frequency or data size. Alternatively and/or additionally, the above values can be normalized, so as to map the access load of each malfunctioning extent to a specified value range (for example, a range of integers 0 to 99).

At block 320, the first malfunctioning extent is selected as a source extent in response to determining that the first extent access load is lower than the second extent access load. According to an example implementation of the present disclosure, the access loads of all the malfunctioning extents can be ranked from low to high. The malfunctioning extent with the lowest access load can be processed first, followed by the malfunctioning extent with the second lowest access load, and so on. It will be understood that with the operation of the storage system, the access loads of the extents may change, and each time after the malfunctioning extent with the lowest access load has been processed, the access loads of the remaining malfunctioning extents can be re-determined to find the malfunctioning extent currently having the lowest access load, until a destination extent has been selected for each malfunctioning extent. According to an example implementation of the present disclosure, re-ranking can be performed at a preset time interval.

At block 330, among multiple idle extents in the storage system, a set of destination extents that can be used as a reconstruction destination of the source extent are generated. It will be understood that the extents in the set of destination extents should meet the following three conditions: the first condition, a storage device where the extent is located is a normal storage device; the second condition, the storage device is different from any storage device in a stripe where the source extent is located; and the third condition, the storage device does not include an extent that is being used as a reconstruction destination. Therefore, idle extents in the storage system that satisfy the above three conditions can be added to the set of destination extents as candidates for reconstruction destinations of malfunctioning extents.

It will be understood that the destination extent here refers to an extent that can be used as the reconstruction destination of the source extent, and this destination extent must be an extent in a normal storage device, so the destination extent should meet the first condition. Based on the requirements of RAID, multiple extents in a stripe must be located in different storage devices, otherwise, the presence of sufficient redundant data cannot be guaranteed. Therefore, the destination extent should satisfy the second condition. Furthermore, if the storage device where the destination extent is located is being used as a destination storage device for a reconstruction operation, that is, this storage device includes an destination extent that is being reconstructed, the current reconstruction operation will write reconstructed data to this storage device and affect the writing speed of the storage device. In order to ensure that the destination extent can have a high writing speed, the destination extent should meet the third condition.

According to an example implementation of the present disclosure, the set of destination extents can be determined based on the above three conditions. In the storage system shown in FIG. 1, storage device 113 malfunctions, and the stripe where the first malfunctioning extent in storage device 113 is located relates to extents in storage devices 110 to 114. Based on the first condition, idle extents can be selected from normal storage devices 110 to 112 and 114 to 117 in the storage system. Based on the second condition, idle extents can be selected from storage devices 115 to 117. Based on the third condition, idle extents can be selected from storage devices that do not include a destination extent that is being reconstructed. Assuming that storage devices 115 and 116 include destination extents that are being reconstructed, then idle extents can only be selected from storage device 117. At this moment, the set of destination extents will include the idle extents in storage device 117.

With the example implementation of the present disclosure, it can be ensured that each extent in the set of destination extents satisfies the requirements of the RAID standard and has a high reconstruction speed. In this way, the time consumed by the reconstruction operation can be shortened, and the risk of another storage device malfunctioning during the reconstruction can be reduced.

At block 340, a destination extent is selected from set of destination extents 230 as the reconstruction destination of the source extent. According to an example implementation of the present disclosure, the destination extent with the highest writing speed in the storage device can be selected based on the access loads of the storage devices where the destination extents are located. Hereinafter, how to select a destination extent will be described with reference to FIG. 4, wherein FIG. 4 schematically illustrates block diagram 400 of a process for selecting a destination extent according to an implementation of the present disclosure.

Figure 4:
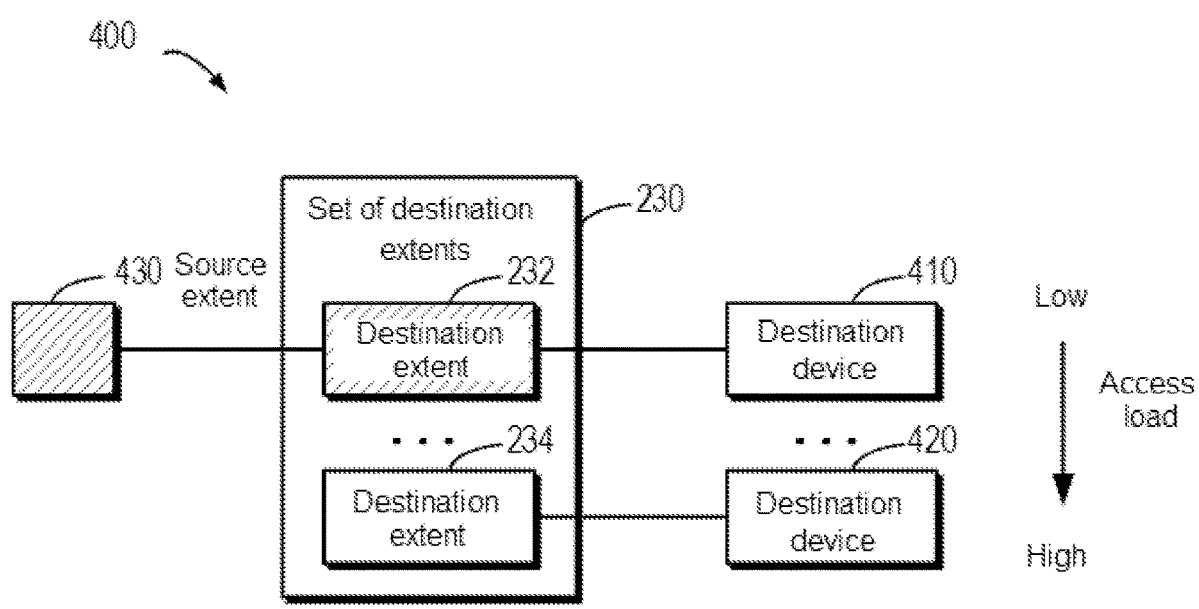
FIG. 4 schematically illustrates a block diagram of a process for selecting a destination extent according to an implementation of the present disclosure.

As shown in FIG. 4, the access load of a destination device where each destination extent in set of destination extents 230 is located is determined respectively, and all the destination devices can be ranked according to the order of access loads from low to high. For example, destination device 410 has the lowest access load and is at the first place, and destination device 420 has the highest access load and is at the last place. At this moment, destination extent 232 located in destination device 410 can be used as the reconstruction destination of malfunctioning extent 220. It will be understood that since destination device 410 has the lowest access load, the speed of writing data to destination device 410 is the highest. The speed of writing reconstructed data to destination device 410 will also be higher than the speed of writing reconstructed data to other destination extents.

With the example implementation of the present disclosure, an idle extent in the storage device with the highest writing speed in the storage system can be used as the reconstruction destination of the source extent. In this way, it can be ensured that each reconstruction operation will reconstruct the least accessed malfunctioning extent in the current storage system to the idle extent with the highest writing speed. At this moment, each reconstruction operation is the fastest possible reconstruction operation in the current storage system, so that as many extents as possible can be reconstructed in a limited time. Therefore, it is possible to "rescue" more extents from the malfunctioning storage device as much as possible to avoid data loss caused by another storage device malfunctioning during reconstruction.

It will be understood that although the above description uses the extent in the destination device with the lowest access load as the destination extent, according to an example implementation of the present disclosure, an idle extent in a storage device with a relatively low access load can be selected as the destination extent. Specifically, for a first storage device where a first destination extent is located and a second storage device where a second destination extent is located, a first device access load and a second device access load may be determined, respectively. If it is determined that the first device access load is lower than the second device access load, the first destination extent can be selected as the destination extent. Although the selected destination extent at this moment is not the extent with the highest writing speed, compared with a conventional method of randomly selecting the destination extent, selecting an extent in a storage device with a relatively low access load can improve the writing speed of the reconstruction operation.

According to an example implementation of the present disclosure, after the destination extent of the source extent has been determined, data in the source extent can be reconstructed to the destination extent. Specifically, the data in the malfunctioning extent can be determined based on data in other normal extents in the stripe where the source extent is located. For example, in a 4D+1P storage system, the data in the malfunctioning extent can be determined based on an XOR operation. According to an example implementation of the present disclosure, after corresponding destination extents have been selected for multiple malfunctioning extents, reconstruction operations can be performed for the multiple malfunctioning extents in parallel. Since the process of selecting the destination extent ensures that each destination extent is located in a different storage device, writing reconstructed data to the multiple different storage devices will not cause a writing bottleneck.

The process of determining the set of destination extents based on multiple conditions has been described above. It will be understood that for a certain malfunctioning extent, the set of destination extents may be an empty set, that is, there is currently no extent that can be used as the reconstruction destination of this malfunctioning extent. When the number of storage devices included in the storage system is small, such a situation is prone to occur. At this moment, if it is determined that the set of destination extents is empty, another malfunctioning extent can be selected from the malfunctioning storage device as the source extent.

Figure 5:
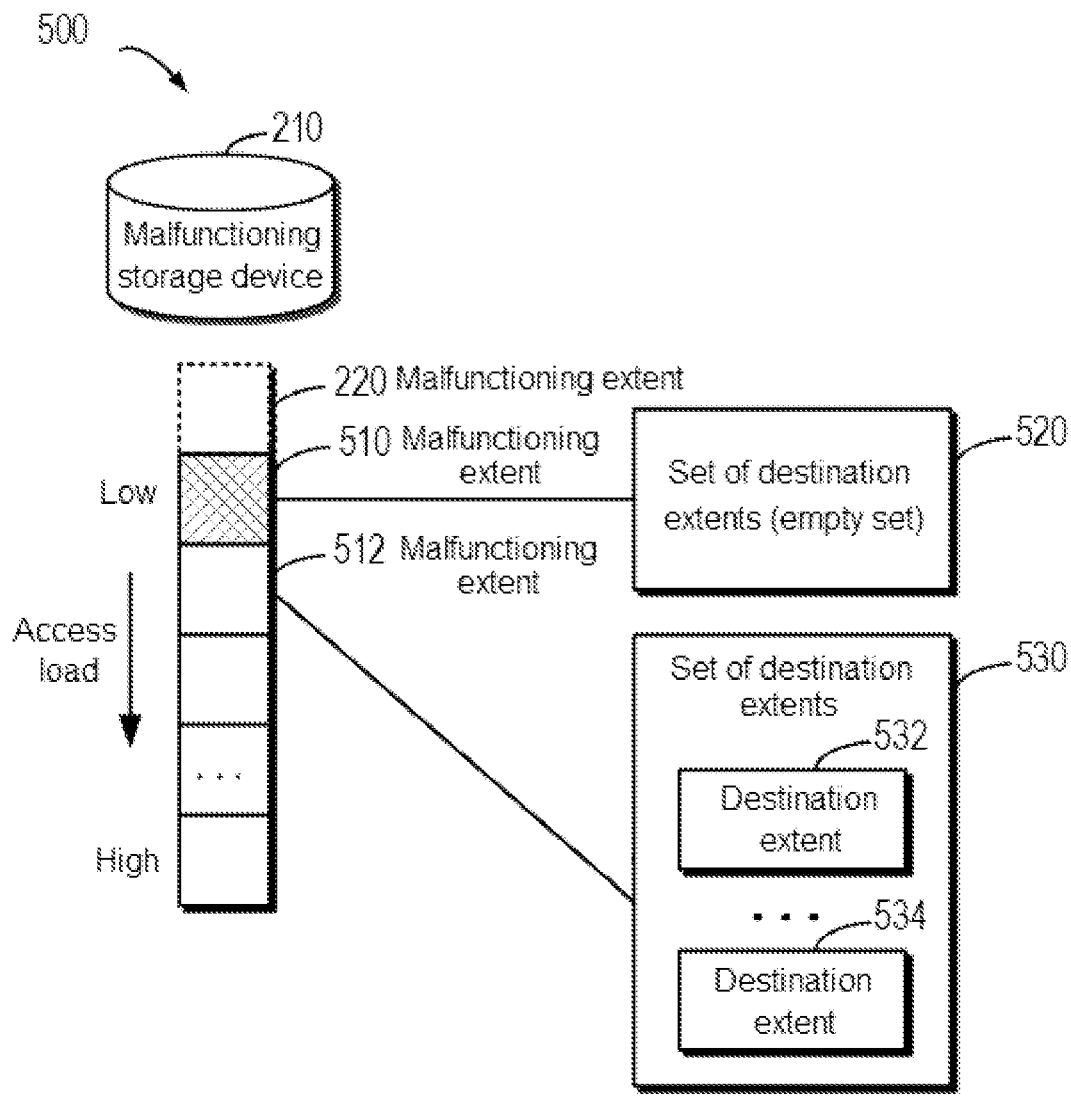
FIG. 5 schematically illustrates a block diagram of a process for determining a set of destination extents for each malfunctioning extent in a malfunctioning storage device according to an implementation of the present disclosure.

Hereinafter, the process of processing each malfunctioning extent in malfunctioning storage device 210 will be described with reference to FIG. 5. FIG. 5 schematically illustrates block diagram 500 of a process for determining a set of destination extents for each malfunctioning extent in a malfunctioning storage device according to an implementation of the present disclosure. The process of processing first malfunctioning extent 220 in malfunctioning storage device 210 has been described above. Since malfunctioning extent 220 has been processed, malfunctioning extent 220 can be marked as "processed." Furthermore, the remaining unprocessed malfunctioning extents can be ranked according to the current access loads of the malfunctioning extents.

Malfunctioning extent 510 is the extent currently having the lowest access load. Set of destination extents 520 of malfunctioning extent 510 can be determined based on the three conditions described above. It will be understood that during the determination of set of destination extents 520, the reconstruction operation for previous malfunctioning extent 220 has already been started. Assuming that the only storage device in the storage system that satisfies the first condition and the second condition includes an extent that is being used as a reconstruction destination, then set of destination extents 520 will be an empty set at this moment. In order to continue the operation of determining the reconstruction destination, malfunctioning extent 510 may be marked as "unprocessed," and the process can continue to process the next malfunctioning extent 512 in malfunctioning storage device 210.

Set of destination extents 530 of malfunctioning extent 512 can be determined according to the method described above. Assuming that set of destination extents 530 includes destination extent 532, . . . , and destination extent 534, then a destination extent located in a storage device with the lowest access load can be selected from the above destination extents. Assuming that set of destination extents 530 is an empty set, this malfunctioning extent 512 can be marked as "unprocessed," and the process can continue to process the next malfunctioning extent.

Alternatively and/or additionally, if it is determined that the set of destination extents of another malfunctioning extent is an empty set, then it is feasible to wait for the reconstruction of the previous malfunctioning extent in the storage system to be completed. After a period of time, since the previously initiated reconstruction operation has been completed, the extents in the storage system that are being used as reconstruction destinations will decrease or even disappear. At this moment, more extents satisfying the third condition will appear, and sets of destination extents of more malfunctioning extents will no longer be empty, so corresponding destination extents can be selected for more malfunctioning extents.

According to an example implementation of the present disclosure, after all malfunctioning extents in malfunctioning storage device 210 have been traversed, malfunctioning extents marked as "unprocessed" may be ranked again. According to an example implementation of the present disclosure, after selecting a destination extent for a malfunctioning extent, the "unprocessed" extents in malfunctioning storage device 210 may be ranked. With the example implementation of the present disclosure, it can be ensured that a destination extent is preferentially selected for the malfunctioning extent with the lowest access load in the malfunctioning storage device each time, so as to increase the reconstruction speed.

According to an example implementation of the present disclosure, since acquiring the access load of each malfunctioning extent in real time and performing the ranking process will result in additional overhead, the collection and ranking processes can be re-performed at a preset time interval. With the example implementation of the present disclosure, malfunctioning extents with low access loads can be preferentially reconstructed without incurring excessive additional overhead.

According to an example implementation of the present disclosure, the method described above can be performed for each malfunctioning extent in malfunctioning storage device 210. That is, all malfunctioning extents in the malfunctioning storage device can be traversed until all the malfunctioning extents are reconstructed. In this way, the malfunctioning extent involving the shortest reconstruction time can be processed preferentially, and the speed of reconstructing extents per unit time can be improved.

It will be understood that, in a resource pool of a storage device, backup storage devices for replacing malfunctioning storage devices may be included. In conventional technical solutions, after malfunctioning extents in a malfunctioning storage device have been reconstructed to normal extents, a backup storage device is used to replace the malfunctioning storage device. According to an example implementation of the present disclosure, a backup storage device may be added to the storage device before the reconstruction operation. Alternatively and/or additionally, the backup storage device may be added to the storage system once the backup storage device is prepared.

Figure 6:
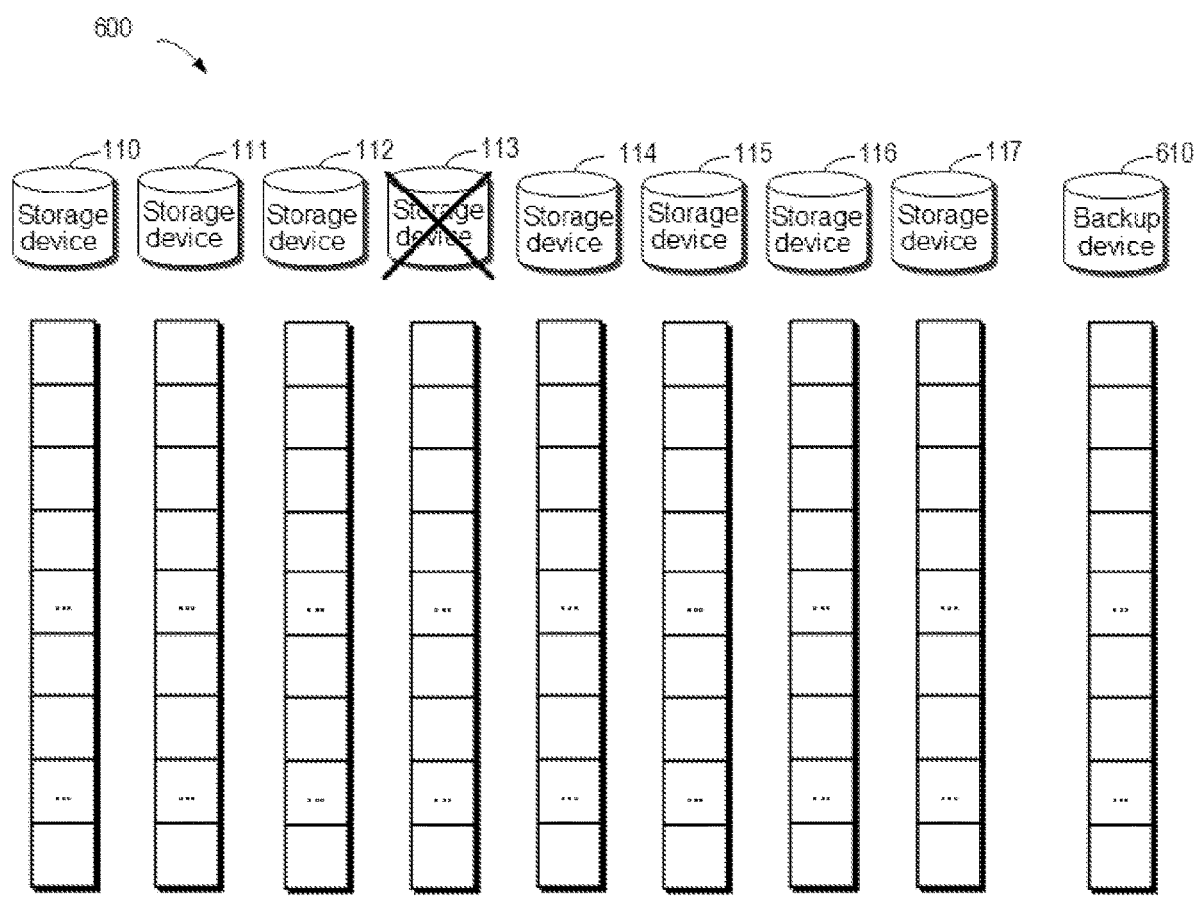
FIG. 6 schematically illustrates a block diagram of a process for adding a backup storage device to a storage system before a reconstruction operation according to an implementation of the present disclosure.

FIG. 6 schematically illustrates block diagram 600 of a process for adding a backup storage device to a storage system before a reconstruction operation according to an implementation of the present disclosure. As shown in FIG. 6, backup storage device 610 can be added to a storage system. At this moment, the storage system will include 8 normal storage devices. The set of destination extents can be determined from multiple idle extents in multiple storage devices in the current storage system.

Specifically, a set of destination extents may be first determined for the first malfunctioning extent in malfunctioning storage device 113. The set of destination extents can be determined based on the 3 conditions described above. For the first condition, idle extents can be selected from 8 normal storage devices 110 to 112, 114 to 117, and 610. For the second condition, assuming that the stripe where this malfunctioning extent is located involves storage devices 110 to 114, then destination extents need to be selected from other storage devices than storage devices 110 to 114 (i.e., storage devices 110 to 114 should be excluded from the above eight normal storage devices), that is, idle extents should be selected from storage devices 115 to 117 and 610. For the third condition, assuming that storage device 115 includes an extent that is being used as a reconstruction destination, then idle extents can only be selected from storage devices 116, 117, and 610 and added to the set of destination extents.

With the example implementation of the present disclosure, more storage devices can be added to the storage device as early as possible. In this case, destination extents can be selected from more storage devices. Therefore, the situation where the set of destination extents is empty can be reduced, and the waiting time can be reduced, thereby improving the efficiency of determining destination extents.

According to an example implementation of the present disclosure, when the RAID type of a storage system allows the presence of multiple malfunctioning storage devices, the method described above can be performed for each malfunctioning storage device, so as to recover each malfunctioning extent in each malfunctioning storage device. When there are multiple malfunctioning storage devices, malfunctioning storage devices with low device loads can be processed first. If a first malfunctioning storage device and a second malfunctioning storage device exist in the storage system, a first device load and a second device load of the first malfunctioning storage device and the second malfunctioning storage device can be determined respectively. If it is determined that the first device load is lower than the second device load, the first malfunctioning storage device may be selected as the malfunctioning storage device.

According to an example implementation of the present disclosure, the device load may include an access load of the malfunctioning storage device. It will be understood that the access load of the malfunctioning storage device will affect the reconstruction speed of a malfunctioning extent. The higher the access load, the lower the reconstruction speed; and the lower the access load, the higher the reconstruction speed. At this moment, malfunctioning storage devices with low access loads can be preferentially reconstructed. With the example implementation of the present disclosure, the malfunctioning storage device with the shortest reconstruction time can be processed first, thereby helping to reconstruct more malfunctioning storage devices in a short time.

According to an example implementation of the present disclosure, the device load may include a usage load (that is, usage rate) of the malfunctioning storage device. It will be understood that the usage load of the malfunctioning storage device reflects a ratio of the used storage space to the total storage space. The higher the usage load, the longer the reconstruction time; and the lower the usage load, the shorter the reconstruction time. At this moment, the malfunctioning storage devices with low usage loads can be reconstructed first, so as to complete the reconstruction of the malfunctioning storage devices with the shortest consuming time as soon as possible.

Hereinafter, the degree of improvement of the reconstruction performance by the method described above will be described with reference to specific examples. Assuming that 0 to 99 are used to represent the access load. The higher the value, the heavier the access load. Assuming that under ideal conditions, the performance of a reconstruction operation is P. Table 1 below illustrates the performance of the reconstruction operation under different access loads.

TABLE 1

The impact of access load on reconstruction performance

| Serial number | Access load | Reconstruction performance |
|---|---|---|
| 1 | 0-4 | P * 100% |
| 2 | 5-9 | P * 85% |
| 3 | 10-14 | P * 70% |
| 4 | 15-19 | P * 55% |
| 5 | 20-24 | P * 40% |
| ... | ... | ... |

As shown in Table 1, when the access load is extremely small (0-4), the reconstruction performance is almost unaffected; when the access load is small (5-9), the reconstruction performance is slightly affected and becomes 85% of that under ideal conditions; and when the access load is large (20-24), the reconstruction performance is greatly affected and becomes 40% of that under ideal conditions. Hereinafter, the reconstruction process according to an example implementation of the present disclosure will be described with reference to FIGS. 7 and 8.

Figure 7:
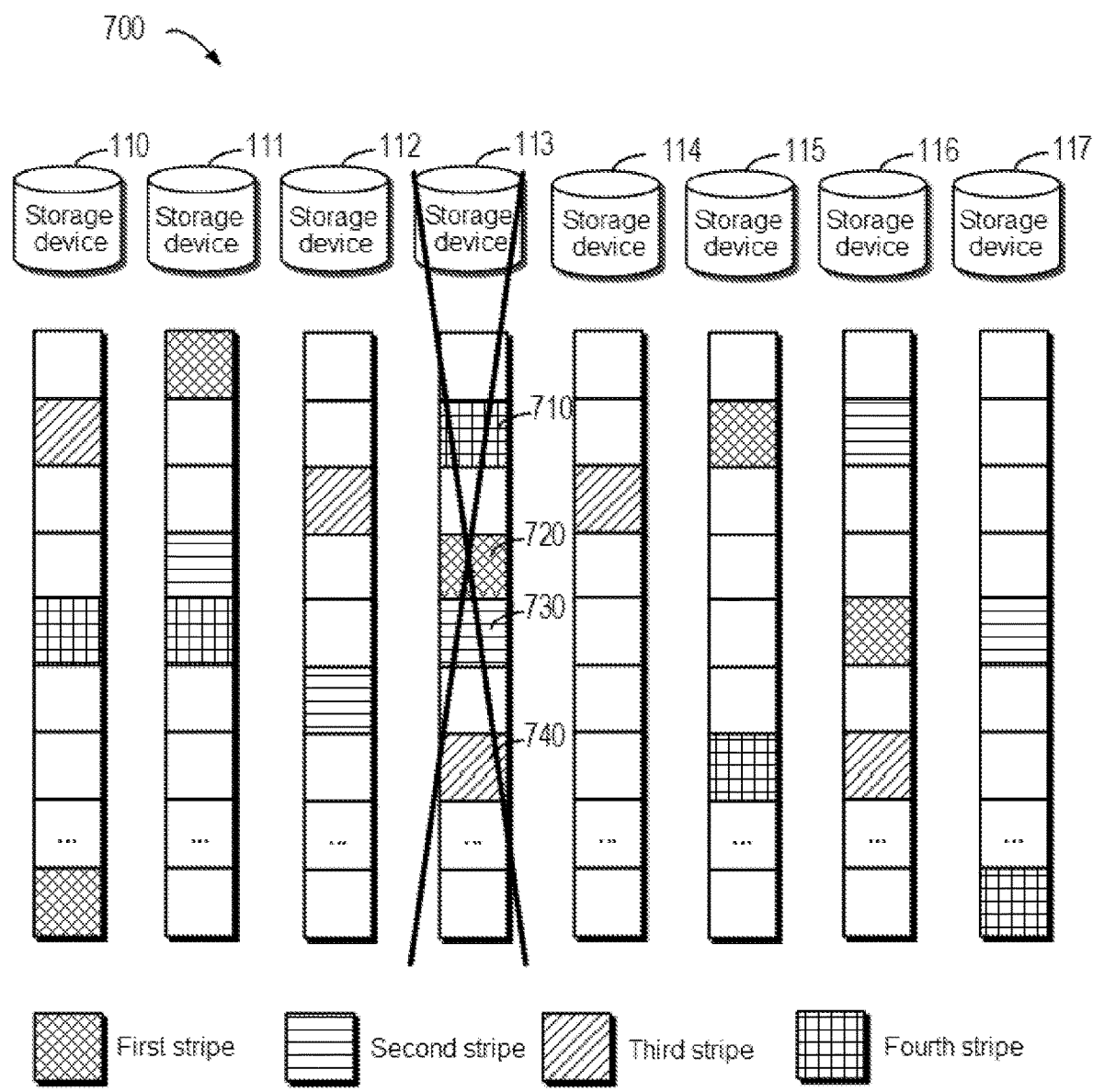
FIG. 7 schematically illustrates a block diagram of distribution of stripes before a reconstruction operation according to an implementation of the present disclosure.

FIG. 7 schematically illustrates block diagram 700 of the distribution of stripes before the reconstruction operation according to an implementation of the present disclosure. As shown in FIG. 7, the storage system includes 4 stripes, and storage device 113 includes extents 710, 720, 730, and 740 in the 4 stripes, respectively. Assuming that storage device 113 malfunctions, then 4 malfunctioning extents in storage device 113 need to be reconstructed. Assuming that the access loads of the extents in the 4 stripes are shown in the following matrix M:

$$M = \begin{bmatrix} 6 & 5 & 8 & 11 & 9 \\ 5 & 7 & 3 & 5 & 8 \\ 6 & 10 & 4 & 7 & 2 \\ 3 & 8 & 1 & 6 & 5 \end{bmatrix}$$

If reconstruction destinations are selected for the 4 malfunctioning extents in storage device 113 according to an existing random method, in the worst case, the reconstruction destination selected each time is located in the extent with the highest access load, and the reconstruction efficiency at this moment will be P*47.5%. In the best case, each time the selected reconstruction destination is located in the extent with the lowest access load, and the reconstruction efficiency at this moment will be P*73.75%.

According to an example implementation of the present disclosure, backup storage devices are added to a storage system before a reconstruction operation starts, and at this moment, there will be more normal storage devices in the storage system. Furthermore, the 4 malfunctioning extents are ranked according to the order of access loads from low to high, and for each malfunctioning extent, an available extent in the storage device with the lowest access load is selected.

Figure 8:
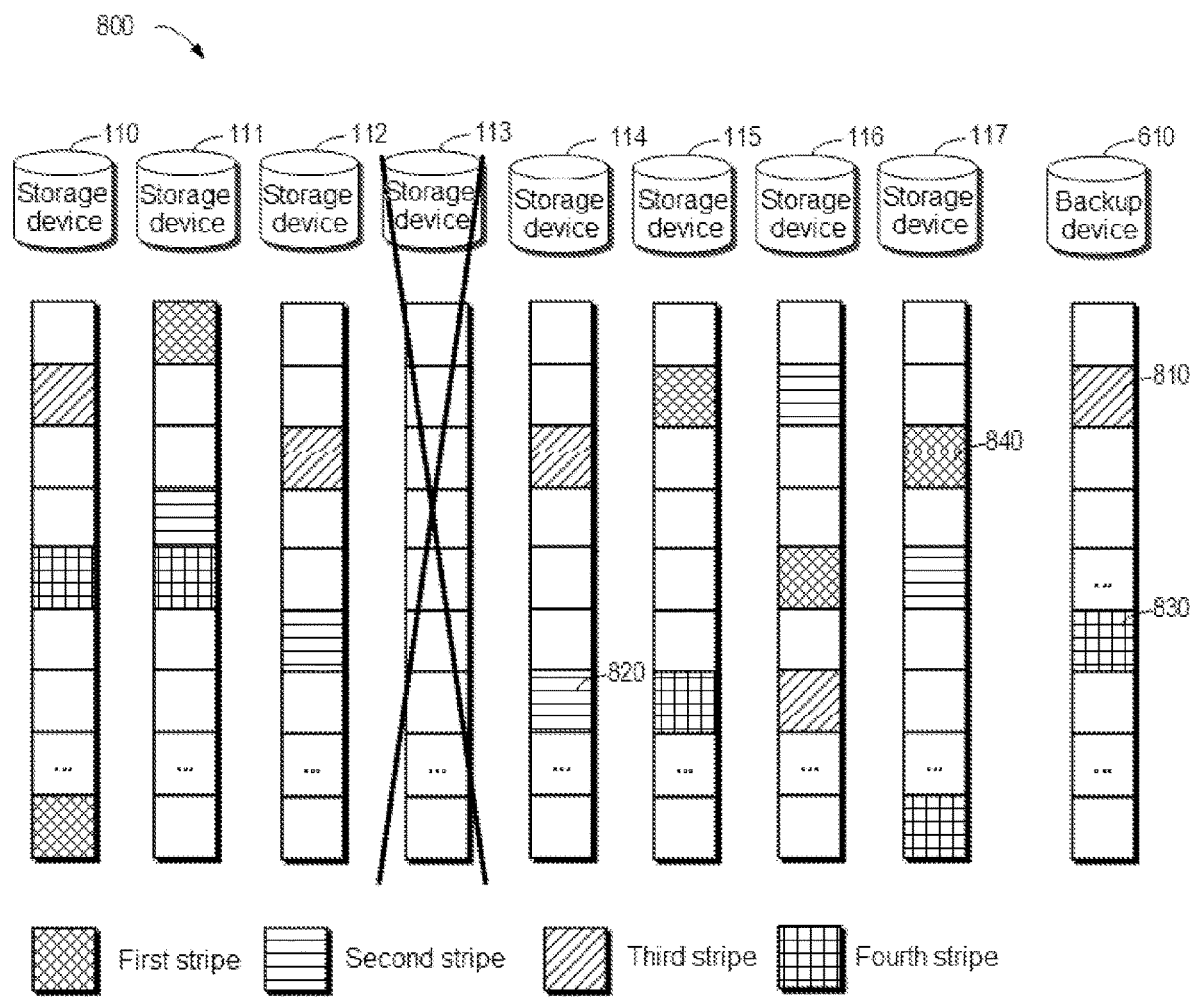
FIG. 8 schematically illustrates a block diagram of distribution of stripes after a reconstruction operation according to an implementation of the present disclosure.

FIG. 8 schematically illustrates block diagram 800 of the distribution of stripes after the reconstruction operation according to an implementation of the present disclosure. Specifically, in the first round, malfunctioning extent 740 with the lowest access load is selected, and it is reconstructed to extent 810 in storage device 117 with the lowest access load. In the second round, malfunctioning extent 730 with the lowest access load is selected, and it is reconstructed to extent 820 in storage device 114 with the lowest access load. In the third round, malfunctioning extent 710 with the lowest access load is selected, and it is reconstructed to extent 830 in storage device 117 with the lowest access load. In the fourth round, malfunctioning extent 720 with the lowest access load is selected, and it is reconstructed to extent 840 in storage device 117 with the lowest access load. At this moment, the reconstruction efficiency will be P*92.5%.

With the example implementation of the present disclosure, determining the source extent according to access loads of malfunctioning extents can give priority to processing the malfunctioning extent that is most easily reconstructed; determining the destination extent according to access loads of storage devices can give priority to using the extent with the highest writing speed; and adding backup storage devices to the storage system before the reconstruction operation starts can increase the number of normal storage devices in the storage system that can be used for reconstruction operations. In this way, the performance of the reconstruction operation can be significantly improved, and the time overhead of the reconstruction operation can be reduced, thereby reducing the risk of other storage devices malfunctioning during the reconstruction operation and causing unrecoverable errors.

It will be understood that although the steps of method 300 are described above only by taking a 4D+1P RAID storage system as an example, according to an example implementation of the present disclosure, the storage system may include other numbers of storage devices for storing data and checks, respectively. For example, a 6D+1P storage system, an 8D+1P+1Q storage system, etc., can be used.

Examples of the method according to the present disclosure have been described in detail above with reference to FIGS. 2 to 8, and implementations of a corresponding apparatus will be described below. According to an example implementation of the present disclosure, an apparatus for reconstructing a storage system is provided. The apparatus includes: a determining module configured to respectively determine a first extent access load and a second extent access load of a first malfunctioning extent and a second malfunctioning extent in a malfunctioning storage device in the storage system; a source extent selecting module configured to select the first malfunctioning extent as a source extent in response to determining that the first extent access load is lower than the second extent access load; a set determining module configured to determine, among multiple idle extents in the storage system, a set of destination extents that can be used as a reconstruction destination of the source extent; and a destination extent selecting module configured to select a destination extent from the set of destination extents as the reconstruction destination of the source extent. According to an example implementation of the present disclosure, this apparatus further includes modules for performing method 300 described above.

Figure 9:
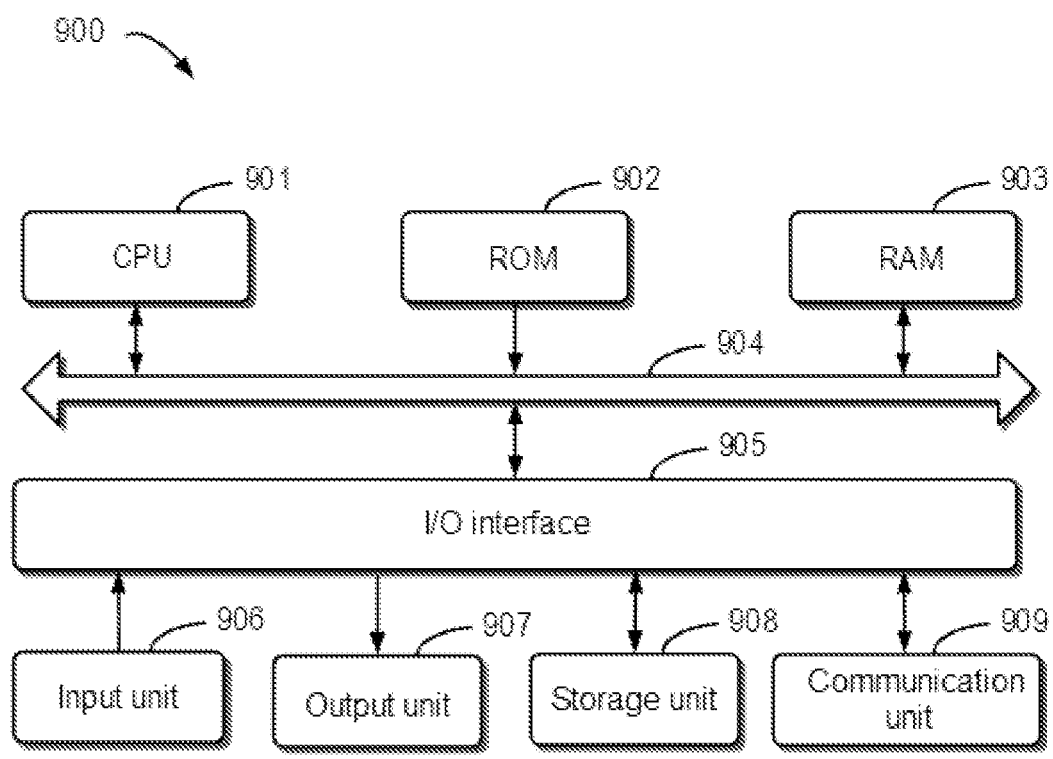
FIG. 9 schematically illustrates a block diagram of a device for reconstructing a storage system according to an example implementation of the present disclosure.

FIG. 9 schematically illustrates a block diagram of device 900 for managing stripes in a storage system according to an example implementation of the present disclosure. As shown in the figure, device 900 includes central processing unit (CPU) 901 that may perform various appropriate actions and processing according to a computer program instruction stored in read-only memory (ROM) 902 or a computer program instruction loaded from storage unit 908 into random access memory (RAM) 903. In RAM 903, various programs and data required for the operation of storage device 900 may also be stored. CPU 901, ROM 902, and RAM 903 are connected to each other through bus 904. Input/output (I/O) interface 905 is also connected to bus 904.

Multiple components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices through a computer network such as the Internet and/or various telecommunication networks.

The various processes and processing described above, such as method 300, may be performed by processing unit 901. For example, in some implementations, method 300 may be implemented as a computer software program that is tangibly included in a machine-readable medium, such as storage unit 908. In some implementations, some or all of the computer program may be loaded and/or installed onto device 900 via ROM 902 and/or communication unit 909. One or more steps of method 300 described above may be performed when the computer program is loaded into RAM 903 and executed by CPU 901. Alternatively, in other implementations, CPU 901 may also be configured in any other suitable manner to implement the above processes/methods.

According to an example implementation of the present disclosure, an electronic device is provided, including: at least one processor; and a memory coupled to the at least one processor and having instructions stored therein, wherein the instructions, when executed by the at least one processor, cause the device to perform an action for reconstructing a storage system. The action includes: acquiring a first extent access load and a second extent access load of a first malfunctioning extent and a second malfunctioning extent in a malfunctioning storage device in the storage system, respectively; selecting the first malfunctioning extent as a source extent in response to determining that the first extent access load is lower than the second extent access load; generating, among multiple idle extents in the storage system, a set of destination extents that can be used as a reconstruction destination of the source extent; and selecting a destination extent from the set of destination extents as the reconstruction destination of the source extent.

According to an example implementation of the present disclosure, generating the set of destination extents includes adding an extent satisfying the following conditions to the set of destination extents: a storage device where the extent is located is a normal storage device; the storage device is different from any storage device involved in a stripe where the source extent is located; and the storage device does not include an extent that is being used as a reconstruction destination.

According to an example implementation of the present disclosure, selecting the destination extent includes: respectively determining a first device access load and a second device access load of a first storage device and a second storage device where a first destination extent and a second destination extent in the set of destination extents are located; and selecting the first destination extent as the destination extent in response to determining that the first device access load is lower than the second device access load.

According to an example implementation of the present disclosure, the action further includes: reconstructing data in the source extent to the destination extent.

According to an example implementation of the present disclosure, the action further includes: selecting another malfunctioning extent in the malfunctioning storage device as the source extent in response to determining that the set of destination extents is empty.

According to an example implementation of the present disclosure, the action further includes: waiting, in response to determining that a set of destination extents of the another malfunctioning extent is an empty set, for the reconstruction of the previous malfunctioning extent in the storage system to be completed.

According to an example implementation of the present disclosure, determining the set of destination extents includes: adding a backup storage device to the storage system; and determining the set of destination extents from multiple idle extents in multiple storage devices in the storage system.

According to an example implementation of the present disclosure, the action further includes: traversing all malfunctioning extents in the malfunctioning storage device until all the malfunctioning extents are reconstructed.

According to an example implementation of the present disclosure, the action further includes: respectively determining, in response to determining that a first malfunctioning storage device and a second malfunctioning storage device exist in the storage system, a first device load and a second device load of the first malfunctioning storage device and the second malfunctioning storage device; and selecting the first malfunctioning storage device as the malfunctioning storage device in response to determining that the first device load is lower than the second device load.

According to an example implementation of the present disclosure, the first device load includes at least any one of an access load and a usage load of the first malfunctioning storage device.

According to an example embodiment of the present disclosure, a computer program product is provided, the computer program product being tangibly stored on a non-transitory computer-readable medium and including machine-executable instructions which are used to implement the method according to the present disclosure.

According to an example embodiment of the present disclosure, a computer-readable medium is provided, the computer-readable medium storing machine-executable instructions which, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals per se, such as radio waves or other freely propagating electromagnetic waves, electromagnetic waves propagating through waveguides or other transfer media (for example, optical pulses through fiber-optic cables), or electrical signals transmitted through electrical wires.

The computer-readable program instructions described herein may be downloaded from a computer-readable storage medium to various computing/processing devices, or downloaded to an external computer or external storage device via a network such as the Internet, a local area network, a wide area network, and/or a wireless network. The network may include copper transfer cables, optical fiber transfer, wireless transfer, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions may be completely executed on a user's computer, partially executed on a user's computer, executed as a separate software package, partially executed on a user's computer and partially executed on a remote computer, or completely executed on a remote computer or a server. In cases where a remote computer is involved, the remote computer may be connected to a user's computer over any kind of networks, including a local area network (LAN) or a wide area network (WAN), or may be connected to an external computer (e.g., over the Internet by using an Internet service provider). In some implementations, an electronic circuit, for example, a programmable logic circuit, a field programmable gate array (FPGA), or a programmable logic array (PLA), is personalized by utilizing state information of computer-readable program instructions, and the electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to implementations of the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or another programmable data processing apparatus, produce a means (e.g., specialized circuitry) for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner, such that the computer-readable medium having instructions stored includes an article of manufacture that includes instructions for implementing various aspects of the functions/actions specified in one or more blocks in the flowcharts and/or block diagrams.

The computer-readable program instructions may also be loaded onto a computer, another programmable data processing apparatus, or another device, so that a series of operating steps may be performed on the computer, another programmable data processing apparatus, or another device to produce a computer-implemented process. Therefore, the instructions executed on the computer, another programmable data processing apparatus, or another device implement the functions/actions specified in one or more blocks in the flowcharts and/or block diagrams.

The flowcharts and block diagrams in the accompanying drawings show the architectures, functions, and operations of possible implementations of systems, methods, and computer program products according to multiple implementations of the present disclosure. In this regard, each block in the flowcharts or block diagrams may represent a module, a program segment, or a part of an instruction that contains one or more executable instructions for implementing specified logical functions. In some alternative implementations, functions labeled in the blocks may also occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various implementations of the present disclosure have been described above. The above description is illustrative but not exhaustive, and is not limited to the various implementations disclosed. Many modifications and variations will be apparent to those of ordinary skill in the art without departing from the scope and spirit of the illustrated various implementations. The selection of terms as used herein is intended to best explain the principles and practical applications of the various implementations or the improvements to technologies on the market, or to enable other persons of ordinary skill in the art to understand the implementations disclosed here.

The invention claimed is:

1. A method for reconstructing a storage system, comprising:
   acquiring a first extent access load and a second extent access load of a first extent in a malfunctioning storage device in the storage system and a second extent in the malfunctioning storage device in the storage system, respectively;
   selecting the first malfunctioning extent as a source extent in response to determining that the first extent access load is lower than the second extent access load;
   generating, among multiple idle extents in the storage system, a set of destination extents that can be used as a reconstruction destination of the source extent;
   selecting a destination extent from the set of destination extents as the reconstruction destination of the source extent; and
   waiting, in response to determining that another set of destination extents of another malfunctioning extent is an empty set, for a reconstruction of a previous malfunctioning extent in the storage system to be completed.

2. The method according to claim 1, wherein generating the set of destination extents comprises adding an extent satisfying the following conditions to the set of destination extents:
   a different storage device where the extent is located is a normal storage device;
   the different storage device is different from any storage device involved in a stripe where the source extent is located; and
   the different storage device does not comprise an extent that is being used as a reconstruction destination.

3. The method according to claim 1, wherein selecting the destination extent comprises:
   respectively determining a first device access load and a second device access load of a first storage device and a second storage device where a first destination extent and a second destination extent in the set of destination extents are located; and
   selecting the first destination extent as the destination extent in response to determining that the first device access load is lower than the second device access load.

4. The method according to claim 1, further comprising:
   reconstructing data in the source extent to the destination extent.

5. The method according to claim 4, further comprising:
traversing all malfunctioning extents in the malfunctioning storage device until all the malfunctioning extents are reconstructed.

6. The method according to claim 1, further comprising:
selecting the another malfunctioning extent in the malfunctioning storage device as the source extent in response to determining that the set of destination extents is empty.

7. The method according to claim 1, wherein determining the set of destination extents comprises:
adding a backup storage device to the storage system; and
determining the set of destination extents from multiple idle extents in multiple storage devices in the storage system.

8. The method according to claim 1, further comprising:
respectively determining, in response to determining that a first malfunctioning storage device and a second malfunctioning storage device exist in the storage system, a first device load and a second device load of the first malfunctioning storage device and the second malfunctioning storage device; and
selecting the first malfunctioning storage device as the malfunctioning storage device in response to determining that the first device load is lower than the second device load.

9. The method according to claim 8, wherein the first device load comprises at least any one of an access load and a usage load of the first malfunctioning storage device.

10. The method according to claim 1, wherein the first extent access load and the second extent access load each indicate an access load exclusive to a respective malfunctioning extent in the malfunctioning storage device;
wherein the method further comprises:
in response to selecting the first malfunctioning extent as the source extent, queuing the second malfunctioning extent as a second source extent.

11. An electronic device, comprising:
at least one processor; and
a memory coupled to the at least one processor, wherein the memory has instructions stored therein which, when executed by the at least one processor, cause the device to perform an action for reconstructing a storage system, the action comprising:
acquiring a first extent access load and a second extent access load of a first malfunctioning extent in a malfunctioning storage device in the storage system and a second malfunctioning extent in the malfunctioning storage device in the storage system, respectively;
selecting the first malfunctioning extent as a source extent in response to determining that the first extent access load is lower than the second extent access load;
generating, among multiple idle extents in the storage system, a set of destination extents that can be used as a reconstruction destination of the source extent;
selecting a destination extent from the set of destination extents as the reconstruction destination of the source extent; and
waiting, in response to determining that another set of destination extents of another malfunctioning extent is an empty set, for a reconstruction of a previous malfunctioning extent in the storage system to be completed.

12. The device according to claim 11, wherein generating the set of destination extents comprises adding an extent satisfying the following conditions to the set of destination extents:
a different storage device where the extent is located is a normal storage device;
the different storage device is different from any storage device involved in a stripe where the source extent is located; and
the different storage device does not comprise an extent that is being used as a reconstruction destination.

13. The device according to claim 11, wherein selecting the destination extent comprises:
respectively determining a first device access load and a second device access load of a first storage device and a second storage device where a first destination extent and a second destination extent in the set of destination extents are located; and
selecting the first destination extent as the destination extent in response to determining that the first device access load is lower than the second device access load.

14. The device according to claim 11, the action further comprising:
reconstructing data in the source extent to the destination extent.

15. The device according to claim 14, the action further comprising:
traversing all malfunctioning extents in the malfunctioning storage device until all the malfunctioning extents are reconstructed.

16. The device according to claim 11, the action further comprising:
selecting the another malfunctioning extent in the malfunctioning storage device as the source extent in response to determining that the set of destination extents is empty.

17. The device according to claim 11, wherein determining the set of destination extents comprises:
adding a backup storage device to the storage system; and
determining the set of destination extents from multiple idle extents in multiple storage devices in the storage system.

18. The device according to claim 11, the action further comprising:
respectively determining, in response to determining that a first malfunctioning storage device and a second malfunctioning storage device exist in the storage system, a first device load and a second device load of the first malfunctioning storage device and the second malfunctioning storage device; and
selecting the first malfunctioning storage device as the malfunctioning storage device in response to determining that the first device load is lower than the second device load.

19. The device according to claim 18, wherein the first device load comprises at least any one of an access load and a usage load of the first malfunctioning storage device.

20. A computer program product having a non-transitory computer readable medium which stores a set of instructions to reconstruct a storage system; the set of instructions, when carried out by computerized circuitry, causing the computerized circuitry to perform a method of:
acquiring a first extent access load and a second extent access load of a first malfunctioning extent in a malfunctioning storage device in the storage system and a second malfunctioning extent in the malfunctioning storage device in the storage system, respectively;

selecting the first malfunctioning extent as a source extent in response to determining that the first extent access load is lower than the second extent access load;

generating, among multiple idle extents in the storage system, a set of destination extents that can be used as a reconstruction destination of the source extent;

selecting a destination extent from the set of destination extents as the reconstruction destination of the source extent; and waiting, in response to determining that another set of destination extents of another malfunctioning extent is an empty set, for a reconstruction of a previous malfunctioning extent in the storage system to be completed.

\* \* \* \* \*